(12) United States Patent
Thomas et al.

(10) Patent No.: US 8,392,175 B2
(45) Date of Patent: Mar. 5, 2013

(54) PHRASE-BASED DOCUMENT CLUSTERING WITH AUTOMATIC PHRASE EXTRACTION

(75) Inventors: Joy Thomas, Sunnyvale, CA (US); Karthik Ramachandran, Sunnyvale, CA (US)

(73) Assignee: Stratify, Inc., Mountain View, CA (US)

( * ) Notice: Subject to any disclaimer, the term of this patent is extended or adjusted under 35 U.S.C. 154(b) by 405 days.

(21) Appl. No.: 12/785,105

(22) Filed: May 21, 2010

(65) Prior Publication Data

US 2011/0191098 A1    Aug. 4, 2011

Related U.S. Application Data

(60) Provisional application No. 61/300,385, filed on Feb. 1, 2010.

(51) Int. Cl.
*G06F 17/20* (2006.01)
*G06F 17/27* (2006.01)
*G06F 17/21* (2006.01)

(52) U.S. Cl. .................. 704/10; 704/9; 704/1

(58) Field of Classification Search .............. 704/1, 8, 704/9, 10; 707/736–739
See application file for complete search history.

(56) References Cited

U.S. PATENT DOCUMENTS

| | | | |
|---|---|---|---|
| 5,794,193 A * | 8/1998 | Gorin ........................ 704/250 |
| 5,857,179 A | 1/1999 | Vaithyanathan et al. |
| 6,137,911 A | 10/2000 | Zhilyaev |
| 6,167,368 A | 12/2000 | Wacholder |
| 6,233,575 B1 | 5/2001 | Agrawal et al. |
| 6,446,061 B1 | 9/2002 | Doerre et al. |
| 6,606,620 B1 | 8/2003 | Sundaresan et al. |
| 6,621,930 B1 | 9/2003 | Smadja |
| 6,651,058 B1 | 11/2003 | Sundaresan et al. |
| 7,165,024 B2 | 1/2007 | Glover et al. |
| 7,299,247 B2 | 11/2007 | Calistri-Yeh et al. |
| 7,308,451 B1 | 12/2007 | Lamping et al. |
| 7,395,256 B2 * | 7/2008 | Ji et al. ........................ 707/737 |
| 7,401,087 B2 | 7/2008 | Copperman et al. |
| 7,426,507 B1 * | 9/2008 | Patterson ........................ 1/1 |
| 7,469,246 B1 | 12/2008 | Lamping |
| 7,496,567 B1 | 2/2009 | Steichen |
| 7,503,000 B1 | 3/2009 | Kreulen |
| 7,558,778 B2 | 7/2009 | Carus et al. |
| 8,209,335 B2 * | 6/2012 | Novak ........................ 707/748 |
| 2002/0065857 A1 | 5/2002 | Michalewicz et al. |
| 2003/0084066 A1 | 5/2003 | Waterman et al. |
| 2003/0172058 A1 * | 9/2003 | Namba ........................ 707/3 |
| 2003/0172357 A1 | 9/2003 | Kao et al. |
| 2003/0217335 A1 * | 11/2003 | Chung et al. ........... 715/514 |

(Continued)

FOREIGN PATENT DOCUMENTS

GB              2442247           4/2008

OTHER PUBLICATIONS

Elsas, Johathan L. et al.; "An Evaluation of Projection Techniques for Document Clustering Latent Semantic Analysis and Independent Component Analysis. A Master's Paper for the M.S. in I.S. degree"; 2005, Advisor: Robert M. Losee, 34 pages.

(Continued)

*Primary Examiner* — Jesse Pullias (57) ABSTRACT

Meaningful phrases are distinguished from chance word sequences statistically, by analyzing a large number of documents and using a statistical metric such as a mutual information metric to distinguish meaningful phrases from groups of words that co-occur by chance. In some embodiments, multiple lists of candidate phrases are maintained to optimize the storage requirement of the phrase-identification algorithm. After phrase identification, a combination of words and meaningful phrases can be used to construct clusters of documents.

17 Claims, 6 Drawing Sheets

U.S. PATENT DOCUMENTS

| | | | | |
|---|---|---|---|---|
| 2004/0064438 | A1* | 4/2004 | Kostoff | 707/1 |
| 2005/0154690 | A1 | 7/2005 | Nitta et al. | |
| 2006/0018551 | A1 | 1/2006 | Patterson | |
| 2006/0020571 | A1 | 1/2006 | Patterson | |
| 2007/0043761 | A1 | 2/2007 | Chim et al. | |
| 2008/0208840 | A1* | 8/2008 | Zhang et al. | 707/5 |

OTHER PUBLICATIONS

Frigui, Hichem et al.; "Simultaneous Categorization of Text Documents and Identification of Cluster-dependent Keywords"; 2002, *International Conference on Fuzzy Systems*, pp. 1108-1113.

Hammouda, Khaled M. et al.; "Efficient Phrase-Based Document Indexing for Web Document Clustering"; 2004, *IEEE Transactions on Knowledge and Data Engineering*, vol. 16, No. 10, pp. 1279-1296.

Hammouda, Khaled M. et al.; "CorePhrase: Keyphrase Extraction for Document Clustering"; 2005, *University of Waterloo Department of Electrical and Computer Engineering*, pp. 265-274.

Kim, Hyoung-rae et al.; "Identifying Variable-Length Meaningful Phrases with Correlation Functions"; 2004, *IEEE International Conference on Tools with Artificial Intelligence*, pp. 30-38.

Peng, Yi et al.; "A Hybrid Strategy for Clustering Data Mining Documents"; 2006, *Sixth IEEE International Conference on Data Mining*, pp. 838-842.

Trappey, Amy J.C. et al.; "Development of a patent document classification and search platform using a back-propagation network"; 2006, *Expert systems with Applications*, vol. 31, pp. 755-765.

Yang, Li et al.; "Dynamic Clustering of Web Search Results"; 2003, *Web of Science, Conference Proceedings*, pp. 153-159.

\* cited by examiner

The quick brown fox jumps over the lazy dog.

| 1-Tuples | 2-Tuples | 3-Tuples |
|---|---|---|
| the (2) | the quick | the quick brown |
| quick | quick brown | quick brown fox |
| brown | brown fox | brown fox jumps |
| fox | fox jumps | fox jumps over |
| jumps | jumps over | jumps over the |
| over | over the | over the lazy |
| lazy | the lazy | the lazy dog |
| dog | lazy dog | |
| 402 | 404 | 406 |

| 1-Tuples | 2-Tuples | 3-Tuples |
|---|---|---|
| quick | quick brown | quick brown fox |
| brown | brown fox | brown fox jumps |
| fox | fox jumps | fox jumps over |
| jumps | jumps over | over the lazy |
| over | lazy dog | |
| lazy | | |
| dog | | |
| 412 | 414 | 416 |

PHRASE-BASED DOCUMENT CLUSTERING WITH AUTOMATIC PHRASE EXTRACTION

CROSS-REFERENCE TO RELATED APPLICATION

This application claims the benefit of U.S. Provisional Application No. 61/300,385, filed Feb. 1, 2010, entitled "Phrase-Based Document Clustering With Automatic Phrase Extraction," the disclosure of which is incorporated by reference herein in its entirety.

BACKGROUND

The present invention relates in general to semantic clustering of documents and in particular to semantic clustering using a combination of words and multi-word phrases that may appear in the document.

With the proliferation of computing devices and communication networks such as the Internet, an ever increasing amount of information is stored in the form of electronic documents. Such documents might be generated using application software such as word processing programs, e-mail programs, web page development tools, etc. Electronic documents can also be generated by scanning paper documents and employing optical character recognition ("OCR") or other techniques to create an electronic representation of the content.

It is often necessary to search through a large collection of electronic documents to find information relevant to a particular question. For example, a number of search services provide interfaces via which users can search electronic documents that are accessible via the World Wide Web. In another context, discovery in civil litigation usually involves the production of massive quantities of electronic documents that the producing and receiving parties must sift through.

To facilitate review of a large corpus of documents, a number of analysis techniques have been developed that automatically determine properties of the document, e.g., by analyzing the patterns of occurrence of words. For example, semantic clustering attempts to group documents pertaining to the same topic, generally based on identifying words or combinations of words that tend to occur in documents within the cluster but not in documents outside the cluster.

One difficulty in semantic clustering is that many languages (such as English) include multi-word groups (phrases) that convey a meaning to a user. The meaning of such phrases can be different from the single words. For example "New York" and "ice cream" are recognized phrases. Human readers recognize such phrases, but computers do not. Semantic clustering algorithms based on single words can thus be missing important pieces of information, leading to less accurate results.

To address this, some efforts have been made to incorporate phrase identification into semantic clustering. For example, some clustering programs provide a list of phrases, and sequences of words from documents can be compared to the list to detect phrases. This form of phrase detection is limited to those phrases that happen to be on the list. Other clustering programs use punctuation cues (e.g., capital letters) to identify phrases; this works well for proper nouns such as "New York" or "Frank Sinatra" but not for phrases such as "ice cream" that are not normally capitalized.

It would therefore be desirable to automate the process of identifying meaningful phrases within documents or collections of documents.

SUMMARY

In certain embodiments of the present invention, meaningful phrases are distinguished from chance word sequences statistically, by analyzing a large number of documents and distinguishing word sequences that occur more often than random sampling would predict from other word sequences. In some embodiments, a mutual information metric (or comparable statistical metric) is defined and computed for multi-word sequences that are possible phrases, and the meaningful phrases are distinguished from chance sequences based on the mutual information metric. A combination of words and meaningful phrases (identified statistically) can be used to construct clusters of documents.

Keeping track of candidate phrases is a challenging problem. For instance, a large corpus (e.g., a million documents) may include tens or hundreds of thousands of distinct words, and possible two-word phrases can number in the tens of millions. For three-word phrases, the numbers are even more staggering. Some embodiments of the present invention reduce the data management burden by maintaining two (or more) candidate phrase lists. In an embodiment with two lists, one list is used to keep track of candidate phrases that have occurred once, the other to keep track of candidate phrases that have occurred multiple times. When a candidate phrase is encountered for the first time, it is added to the first list; if it occurs again, it is moved to the second list and an occurrence count is maintained. To keep storage requirements within manageable bounds, the first list can be limited to a maximum number of candidate phrases (e.g., on the order of one million). Once this limit is reached, each time a new candidate phrase is added to the first list, an older candidate phrase is dropped from the list; the candidate phrase to be dropped can be selected randomly, pseudorandomly or by other selection algorithms such as least recently added.

One aspect of the present invention relates to methods of extracting phrases from a corpus of documents. A processor can generate a set of candidate phrases from the documents in the corpus, where each candidate phrase corresponds to a group of two or more words that occur consecutively in at least one of the documents in the corpus and each candidate phrase has an associated occurrence count. The processor can compute a statistical metric for each candidate phrase based at least in part on the occurrence count; the statistical metric can be any metric that indicates a likelihood of the words within the candidate phrase occurring consecutively by chance. Based on the statistical metric, the processor can select some (or potentially all) of the candidate phrases as meaningful phrases.

In some embodiments, the method includes keeping two lists of candidate phrases. When a group of consecutive words from one of the documents in the corpus, a determination is made as to whether the group of consecutive words appears as one of the candidate phrases in a first list of candidate phrases. If so, then an occurrence count associated with that candidate phrases is incremented. If not, a determination is made as to whether the group of consecutive words appears as one of the candidate phrases in a second list of candidate phrases. If so, then that candidate phrase is promoted to the first list (with an occurrence count of 2); if not, then the group of consecutive words is added as a new candidate phrase to the second list. An upper limit (e.g., one million phrases) can be imposed on the number of candidate phrases in the second list. If the limit is reached, then a candidate phrase from the list can be deleted each time a new phrase is to be added. The phrase to be deleted can be selected randomly, pseudorandomly, or according to some other selection algorithm.

In some embodiments, the method can also include forming clusters of documents. For example, document vectors can be constructed for documents from the corpus. The document vector for each document can include some components that correspond to words and other components that correspond to some or all of the meaningful phrases. Documents can be clustered based on similarity of the vectors (e.g., using known techniques for comparing document vectors).

In some embodiments, the method can also include assigning names to the clusters. For example, the most frequently occurring terms in the cluster (where "term" refers to either a word or a meaningful phrase) can be identified as candidate terms for the name. If a word appears in more than one of the candidate terms, then a single term containing the word can be selected as a candidate term. After de-duplicating the candidate terms (so that no word appears in more than one term), some of the candidate terms can be selected for inclusion in the name for the cluster. This selection can be based on weights associated with the candidate terms. In some embodiments, the resulting cluster name includes multiple terms, with no word appears in more than one of the terms.

Another aspect of the invention relates to computer readable storage media containing program instructions that, when executed by a computer system cause the computer system to execute a method of forming document clusters from a corpus of documents. For example the computer system can generate a set of candidate phrases from the documents in the corpus, with each candidate phrase corresponding to a group of two or more words that occur consecutively in at least one of the documents in the corpus. The computer system can compute a mutual information metric for each candidate phrase based on one or more occurrences of the candidate phrase and one or more separate occurrences of the words within the candidate phrase. Based on the mutual information metric, meaningful phrases can be selected from the set of candidate phrases, the selection being based on the mutual information metric. Occurrence patterns of the meaningful phrases and single words in the documents can be used to form document clusters.

Another aspect of the invention relates to a computer system. The computer system can include a storage subsystem and a processor coupled to the storage subsystem. The processor can be configured, e.g., by providing suitable program code, to extract and store in the storage subsystem a set of candidate phrases from the corpus of documents, where each candidate phrase corresponds to a group of two or more words that occur consecutively in at least one of the documents in the corpus. The processor can also be configured to compute a statistical metric for each of the candidate phrases based on occurrence count data indicating a number of occurrences of the candidate phrase in documents of the corpus and a number of occurrences of the words making up the candidate phrase; any statistical metric can be used that indicates a likelihood of the words within candidate phrase occurring consecutively by chance. The processor can also be configured to select one or more phrases from the set of candidate phrases as a meaningful phrase, based on the statistical metric and to store a list of the meaningful phrases in the storage subsystem.

The following detailed description together with the accompanying drawings will provide a better understanding of the nature and advantages of the present invention.

DETAILED DESCRIPTION

In certain embodiments of the present invention, meaningful phrases are distinguished from chance word sequences statistically, by analyzing a large number of documents and distinguishing word sequences that occur more often than random sampling would predict from other word sequences. In some embodiments, a mutual information metric (or comparable statistical metric) is defined and computed for multi-word sequences that are possible phrases, and the meaningful phrases are distinguished from chance sequences based on the mutual information metric. A combination of words and meaningful phrases (identified statistically) can be used to construct clusters of documents.

Keeping track of candidate phrases is a challenging problem. For instance, a large corpus (e.g., a million documents) may include tens or hundreds of thousands of distinct words, and possible two-word phrases can number in the tens of millions. For three-word phrases, the numbers are even more staggering. Some embodiments of the present invention reduce the data management burden by maintaining two (or more) candidate phrase lists. In an embodiment with two lists, one list is used to keep track of candidate phrases that have occurred once, the other to keep track of candidate phrases that have occurred multiple times. When a candidate phrase is encountered for the first time, it is added to the first list; if it occurs again, it is moved to the second list and an occurrence count is maintained. To keep storage requirements within manageable bounds, the first list can be limited to a maximum number of candidate phrases (e.g., on the order of one million). Once this limit is reached, each time a new candidate phrase is added to the first list, an older candidate phrase is dropped from the list; the candidate phrase to be dropped can be selected randomly, pseudorandomly, or by some other selection algorithm such as least recently added.

System Overview

Figure 1:
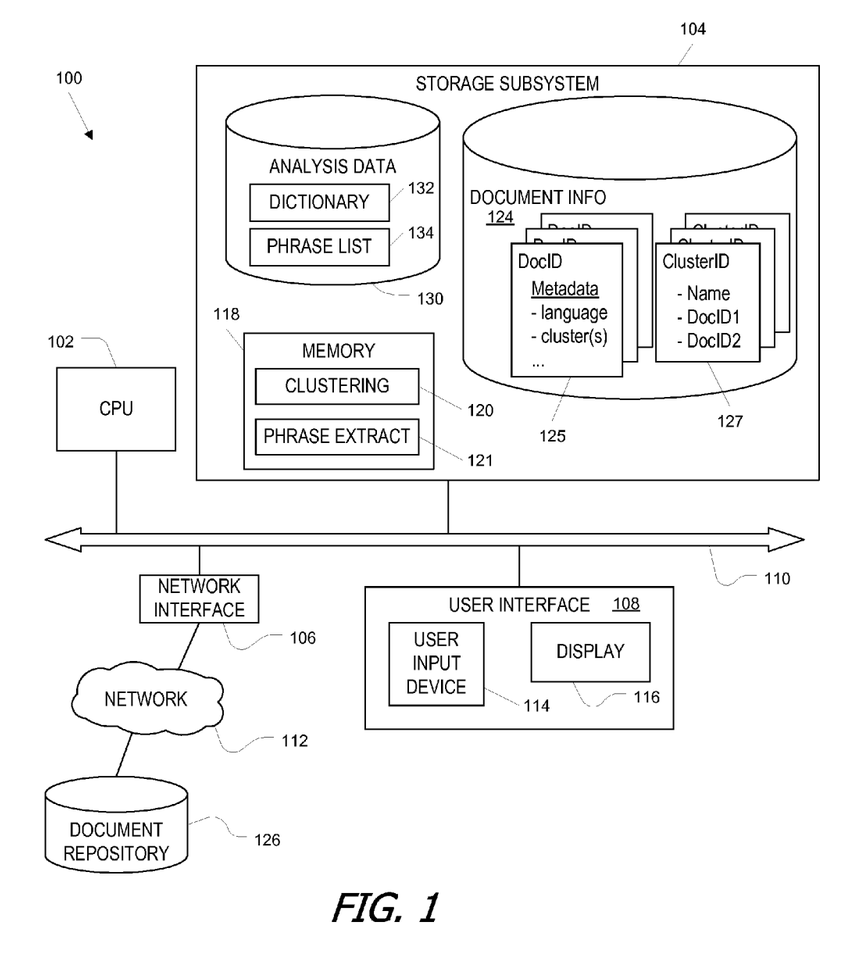
FIG. 1 is a block diagram of a computer system according to an embodiment of the present invention.

FIG. 1 is a block diagram of a computer system 100 according to an embodiment of the present invention. Computer system 100 includes a CPU 102, storage subsystem 104, network interface 106, and user interface 108 connected via a bus 110. CPU 102 can be, e.g., any programmable general-purpose processor. Network interface 106 provides access to one or more other computer systems via a network 112, which can include, e.g., a local area network (LAN), a wide area network (WAN), the Internet (a globally interconnected network of computer networks), a virtual private network, and so on. Network interface 106 can be implemented using standard protocols, including wired protocols (e.g., Ethernet) and/or wireless protocols (any IEEE 802.11 protocol). User interface 108 can include one or more input devices 114 such as a keyboard, mouse, touch screen, touch pad, etc., and one or more output devices such as a display 116. Bus 110 can be implemented using conventional bus architectures and may include bridges, bus controllers, and the like.

Storage subsystem 104 incorporates various computer-readable storage media to provide storage for programs and data accessed by CPU 102 and/or other components of computer system 100. In the embodiment shown, storage subsystem 104 includes primary memory 118. Primary memory 118 provides the fastest access times and can be implemented using known memory technologies such as DRAM (dynamic random access memory) and/or SRAM (static random access memory). Primary memory 118 is advantageously used at any given time to store programs and/or data that are actively in use by CPU 102. Thus, for example, memory 118 is shown as storing a clustering program 120 that, when executed, causes CPU 102 to generate clusters from documents in the corpus. Memory 118 in this example also stores a phrase extraction program 121 that, when executed, causes CPU 102 to identify meaningful phrases based on statistical usage patterns in the document corpus. These phrases can be used within clustering program 120. Examples of phrase extraction and phrase-based clustering are described below.

Storage subsystem 104 in this embodiment also provides various secondary storage areas, which can include, e.g., magnetic media such as conventional hard or floppy disks, optical media such as compact disc (CD), digital versatile disc (DVD), or the like, and/or semiconductor media such as flash memory. Secondary storage areas generally have longer access time than primary memory 118 but have larger storage capacity. In this example, secondary storage areas are provided for an analysis data store 130 and a document information data store 124.

Document information data store 124 provides information (also referred to as metadata) about a corpus of documents. As used herein, a "corpus" of documents can be any collection of documents about which information is to be provided to a user of system 100. In one embodiment, the corpus of documents (or a portion thereof) can be stored in a document repository 126 that is remote from computer system 100 and accessible via network interface 106 and network 112. In another embodiment, the corpus (or a portion thereof) can be stored locally, e.g., within storage subsystem 104. The corpus can be centralized or distributed (e.g., it can be a collection of World Wide Web documents that are stored on respective web servers connected to network 112 as is known in the art) as desired, and document information data store 124 might or might not contain actual documents.

Document information data store 124 can include a document record 125 for each document in the corpus. Document record 125 can include, e.g., a unique identifier of the document ("DocID") and metadata about the document, including for example identifiers for any clusters to which the document has been assigned by clustering program 120. Other information about the documents can also be stored, such as date of creation, editing, and/or addition to the corpus; type of document (e.g., e-mail, web page, word processor document); author; source or location from which the document was obtained; a condensed representation of document content in a readily searchable form; language information; keywords; and so on.

Document information data store 124 can also include a cluster map 127 that provides lists of document identifiers associated with each cluster generated by clustering program 120. Other information about the clusters, such as a cluster name, a relationship (e.g., hierarchical relationship) to other clusters, and so on, can also be included in cluster map 127.

In some embodiments, highly similar documents may be treated as the same document for purposes of clustering, and document information data store 124 can be organized such that highly similar documents are grouped together. An example of such an implementation is described in commonly-assigned co-pending U.S. Patent Application No. 61/300,382 filed of even date herewith.

Analysis data store 130 in this embodiment provides data that can be referenced by programs executing on CPU 102, e.g., phrase extraction program 121 and/or clustering program 120. For example, analysis data store 130 can include a dictionary 132. As used herein, a "dictionary" can include any list of words (i.e., character strings) in any language or combination of languages, and the list can include any number of words. Dictionary 132 can be used to define a "term space" for purposes of characterizing a document. Analysis data store 130 can also provide a phrase list 134, which can include meaningful phrases that can be used in clustering. In some embodiments, phrase list 134 is populated automatically through execution of phrase extraction program 121. At various times, analysis data store 130 can also include other data such as cluster definitions or the like that may be useful in analyzing documents.

It will be appreciated that computer system 100 is illustrative and that variations and modifications are possible. For example, although storage subsystem 104 is shown as local to system 100, in alternative embodiments, all or part of storage subsystem 104 can be implemented as remote storage, e.g., on a storage area network (SAN) or other remote server accessible via network 112. Thus, for example, document information data store 124 and/or analysis data store 130 can be stored locally or remotely as desired. Further, although clustering program 120 and phrase extraction program 121 are shown as residing in primary memory 118, the invention is not limited to any particular mechanism for supplying program instructions for execution by CPU 102. For instance, at any given time some or all of the program instructions for clustering program 120 or phrase extraction program 121 may be present within CPU 120 (e.g., in an on-chip instruction cache and/or various buffers and registers), in a page file or memory mapped file on a system disk, and/or in other local or remote storage space. In some embodiments, computer system 100 might be implemented as a server accessible to a user via a network, and user interface 108 is optional. Computer system 100 may also include additional components such as floppy disk drives, optical media drives (e.g., CD or DVD), network interface components, USB interface, and the like. Computer system 100 can be configured with many different hardware components and can be made in many dimensions and styles (e.g., laptop, tablet, server, workstation, mainframe); network connections may be provided via any suitable transport media (e.g., wired, optical, and/or wireless media) and any suitable communication protocol (e.g., TCP/IP). A particular computer architecture or platform is not critical to the present invention.

Phrase-Based Clustering Overview

Figure 2:
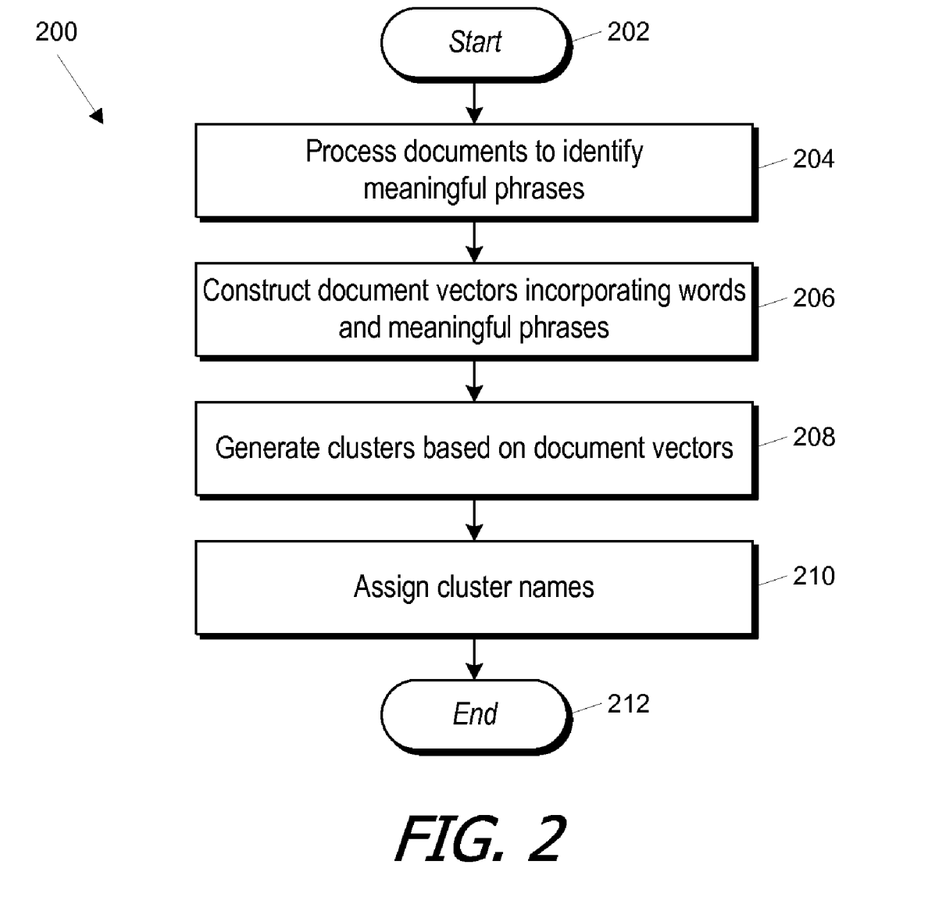
FIG. 2 is a flow diagram of a process for phrase-based clustering according to an embodiment of the present invention.

FIG. 2 is a flow diagram of a process 200 for phrase-based clustering according to an embodiment of the present invention. In process 200, a corpus of documents can be processed twice: once to identify meaningful phrases and again to form clusters using words and phrases.

Process 200 starts (block 202) with a corpus of documents that can be provided in various ways (e.g., via document collection processes or Web crawlers). At block 204, the corpus is processed to identify meaningful phrases based on statistical properties of the documents in the corpus; examples of algorithms that can be used are described below.

At block 206, a document vector is constructed for each document using a combination of words and meaningful phrases (as identified at block 204). At block 208, clusters are generated based on the document vectors. Known clustering algorithms, such as those described in U.S. Pat. No. 7,469,246 and U.S. Pat. No. 7,308,451, or other algorithms can be used.

At block 210, a name is generated for each cluster. The name can incorporate both words and phrases that frequently occur in the vectors of documents in the cluster. An example of name generation using words and phrases as terms is described below. Thereafter, process 200 can end (block 212).

It will be appreciated that process 200 is illustrative and that variations and modifications are possible. The following sections describe specific implementations of various blocks within process 200.

Phrase Extraction

As noted above, meaningful phrases can be automatically extracted from a corpus of documents using statistical analysis. Ideally, a meaningful phrase is one that conveys a distinct meaning to a person when its constituent words are read as a unit. For example, "New York" and "can of worms" are meaningful phrases to English speakers; in this case, the meaning is something other than the sum of the individual words. In some cases, a phrase can be meaningful by virtue of narrowing a broad field in a helpful way; for instance, "computer security" and "airport security" identify specific (and very different) areas within the broad field of "security."

In embodiments of the present invention, phrases are extracted using statistical properties, and a "meaningful" phrase as used herein refers generally to any phrase that passes statistical tests (e.g., as described below) indicating that it is likely to convey a distinct meaning to a person, rather than being a chance conjunction of words. It should be noted that not all phrases identified as meaningful by the techniques described herein need actually convey a distinct meaning to a person.

Figure 3:
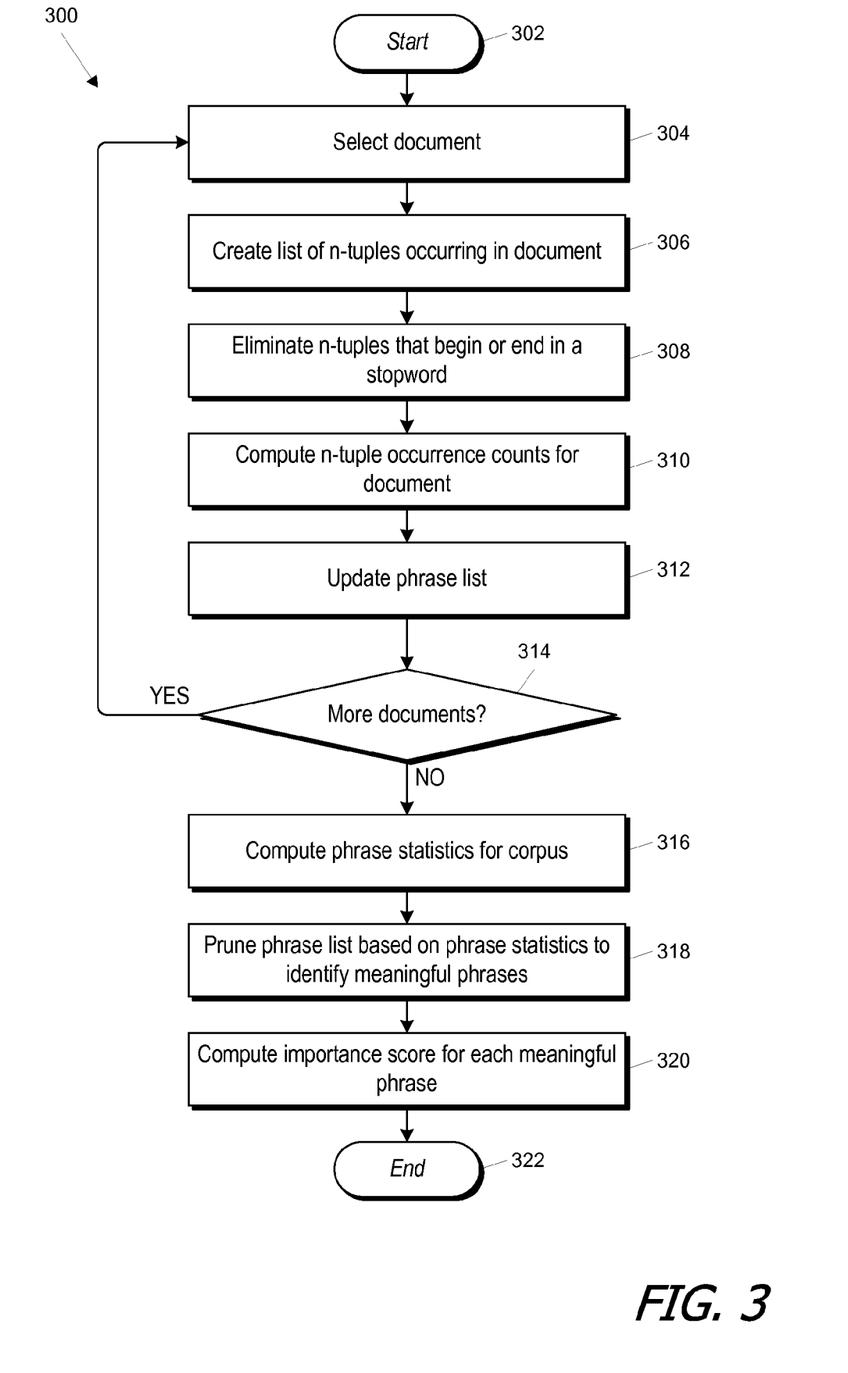
FIG. 3 is a flow diagram of a phrase extraction process according to an embodiment of the present invention.
Figure 4:
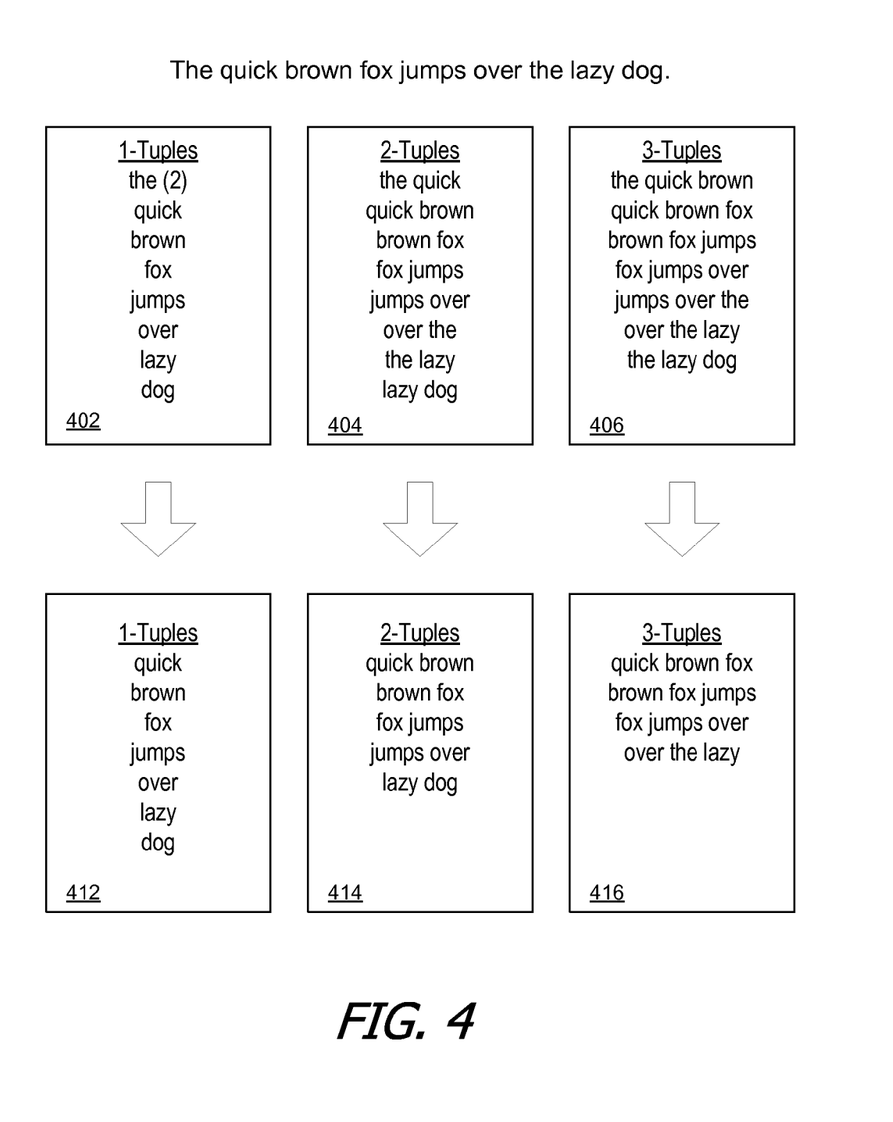
FIG. 4 illustrates n-tuples for a representative text according to an embodiment of the present invention.

FIG. 3 is a flow diagram of a phrase extraction process 300 according to an embodiment of the present invention. Process 300 starts (block 302) with a corpus of documents to be analyzed. At block 304 a first document is selected. At block 306, a list of "n-tuples" of words occurring in the document is generated. As used herein, an "n-tuple" is a set of n consecutive words for some integer n. In various embodiments, block 306 can include parsing the document into tokens (words) using conventional token-extraction software, then generating a list of n-tuples from the tokens. A 1-tuple is a single word, a 2-tuple is a pair of consecutive words, and a 3-tuple is a trio of consecutive words. Thus, for example, in "The quick brown fox jumps over the lazy dog," "quick" would be a 1-tuple, "quick brown" would be a 2-tuple, and "quick brown fox" would be a 3-tuple. In some embodiments, all n-tuples are generated for n running from 1 to $n_{max}$; in one such embodiment, $n_{max}$=3. A list of n-tuples for "The quick brown fox jumps over the lazy dog" is shown in FIG. 4 for $n_{max}$=3. Single words (1-tuples) are listed in box 402, two-word sequences (2-tuples) in box 404, and three-word sequences (3-tuples) in box 406.

In some embodiments, punctuation can be taken into consideration when generating n-tuples for n>1. For example, meaningful phrases typically do not include periods or commas (or certain other punctuation marks) between the words. Accordingly, n-tuple extraction can use punctuation marks as barriers. Thus, for example the words "blue fox" would not be extracted as a 2-tuple if they appeared as "blue. Fox" but would be if they appeared as "blue fox" with no intervening punctuation.

At block 308, the list of n-tuples is cleaned up. For example, 1-tuples that are stopwords and any larger n-tuples that begin or end in a stopword can be removed from the list. As is known in the art, "stopwords" are terms used with such high frequency that they are generally unhelpful in statistical analysis of document content. Examples of stopwords include indefinite articles (e.g., "a," "an"), definite articles (e.g., "the," "this," "that"), and common prepositions (e.g., "of"). In one embodiment, a list of stopwords can be stored in dictionary 132 (FIG. 1) or elsewhere, and stopwords in the n-tuples can be identified by checking against the list.

By way of example, FIG. 4 illustrates the effect of removal of stopwords in one embodiment. In this embodiment, stopword removal transforms list 402 to list 412, list 404 to list 414, and list 406 to list 416. Note that in this embodiment, 3-tuples with stopwords in the middle (e.g., "over the lazy") are not removed. This allows detection of phrases such as "can of worms."

At block 310, for the remaining n-tuples, the number of occurrences of each n-tuple is determined. At block 312, for n-tuples with n>1, a phrase list is updated. The phrase list keeps track of candidate phrases that have been found in documents and the number of occurrences of each candidate phrase.

One of the difficulties in extracting meaningful phrases lies in the rapidity with which the number of candidate phrases increases as documents are analyzed. For example, a large document corpus (e.g., a million documents) might contain hundreds of thousands of unique words, but tens of millions of unique phrases. Storing all unique n-tuples as candidate phrases can be done, given enough disk space; however, some embodiments reduce the storage requirement through careful management of phrase lists, e.g., as described below.

At block 314, it is determined whether more documents remain to be processed. If so, process 300 returns to block 304 to select the next document.

After all documents have been processed, at block 316 phrase statistics for the corpus are computed. In some embodiments, the phrase statistics include a mutual information metric that indicates likelihood that the words in a particular candidate phrase appeared together by chance. For example, the mutual information between two random variables X (with possible values $x_i$) and Y (with possible values $y_j$) can be defined as:

$$I(X:Y) = \sum p(x_i, y_j) \log \frac{p(x_i, y_j)}{p(x_i)p(y_j)}, \quad \text{(Eq. 1)}$$

where $p(x_i)$ is the probability of value $x_i$, $p(y_j)$ is the probability of $y_j$, $p(x_i, y_j)$ is the probability of $x_i$ and $y_j$ co-occurring, and the sum is taken over all combinations of $(x_i, y_j)$.

In the case of a candidate phrase with two words A and B, Eq. (1) can be used, with the possible values of X being A or non-A (denoted ~A herein) and possible values of Y being B or non-B (denoted ~B herein). Accordingly, p(A) is the number of occurrences of word A divided by the total number of (non-unique) words in the corpus, p(B) is the number of occurrences of word B divided by the total number of words in the corpus, and p(A, B) is the number of occurrences of phrase AB divided by the total number of two-word phrases in the corpus. The remaining probabilities are defined as follows:

$$p(\sim A)=1-p(A); \quad \text{(Eq. 2)}$$

$$p(\sim B)=1-p(B); \quad \text{(Eq. 3)}$$

$$p(A,\sim B) = p(A) - p(A,B); \quad \text{(Eq. 4)}$$

$$p(\sim A,B) = p(B) - p(A,B); \text{ and} \quad \text{(Eq. 5)}$$

$$p(\sim A,\sim B) = 1 - p(A,B) - p(\sim A,B) - p(A,\sim B). \quad \text{(Eq. 6)}$$

It should be noted that in general, $p(A)$, $p(B)$, and $p(A, B)$ are expected to be quite small, e.g., on the order of $10^{-5}$ or even smaller. Consequently, the most significant term in Eq. (1) is the $x_i=A$, $y_j=B$ term. Thus, in some embodiments, the mutual information metric can be simplified to the form:

$$I = p(A, B)\log\frac{p(A, B)}{p(A)p(B)}. \quad \text{(Eq. 7)}$$

Similar formulas can be applied for mutual information among three words or more generally among n words for any n>1.

Given a phrase AB that occurs at least once, the mutual information computed using Eq. (1) will always be nonzero; it will be small if the words are unrelated (i.e., the phrase AB occurs only by chance) and large if the two are closely related (i.e., the phrase AB occurs significantly more often than chance would suggest).

Using this approach, a mutual information score can be calculated for each phrase. Other statistical measures such as a conventional chi-square test can also be used to measure the correlation between words in a phrase to identify phrases where the words occur together more frequently than expected by chance.

At block 318, the mutual information score (or other statistical measure) can be used to prune the phrase list, thereby identifying meaningful phrases. For example, the phrases can be sorted in descending order of mutual information score and a threshold applied to select the meaningful phrases to be used in clustering. The threshold can be set as a limit on the number of phrases retained (e.g., the 50 phrases with highest scores) or as a minimum mutual information score, which can be tuned to provide approximately a desired number of meaningful phrases.

At block 320, an importance score, or weight, can be computed for each meaningful phrase. In general, words and phrases that occur in relatively few documents are considered more useful for clustering than common words and phrases. Accordingly, in one embodiment, the weight assigned to a meaningful phrase can be log (1/D), where D is the number of documents in which the phrase occurs at least once. Other weights can also be used.

At block 322, process 300 ends. The meaningful phrases can be stored in phrase list 134 (FIG. 1) and used in clustering, e.g., as described above.

Phrase List Management

As noted above, one of the difficulties in automatic phrase extraction is managing the number of candidate phrases. Most phrases extracted from documents are uninteresting conjunctions of words, such as "quick brown," but since the distinction between meaningful phrases and uninteresting conjunctions of words is not made in advance, such conjunctions should be tracked. Any number of phrases can be tracked, given enough storage; however, in today's computer systems, providing sufficient storage generally requires using magnetic disk, which is slower than semiconductor memory devices. Thus, in some embodiments, optimization techniques can be used to reduce the number of phrases for which information is stored.

Figure 5:
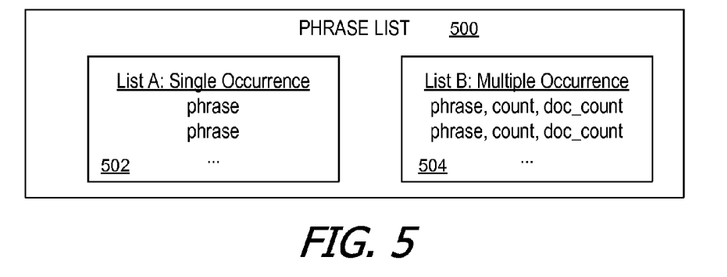
FIG. 5 illustrates an optimized phrase list structure according to an embodiment of the invention.

FIG. 5 illustrates an optimized phrase list structure 500 according to an embodiment of the invention. Phrase list structure 500 includes two lists: "list A" 502, which stores phrases that have occurred exactly once in the portion of the corpus analyzed so far, and "list B" 504, which stores phrases that have occurred at least twice and keeps a count (count) of the number of occurrences of each phrase. In some embodiments, list B also keeps a count (doc_count) of the number of documents in which the phrase occurred at least once. List A 502 has a predetermined maximum size, e.g., one million entries. List B does not have a maximum size. The first time a phrase occurs, it is added to list A; if the phrase occurs again, it can be moved (promoted) to list B. If list A fills up and a new phrase occurs for the first time, the new phrase replaces a previous phrase from list A. The phrase to be replaced can be selected randomly, pseudorandomly, or according to some other rule, e.g., replacing the least recently encountered phrase on the list.

Figure 6:
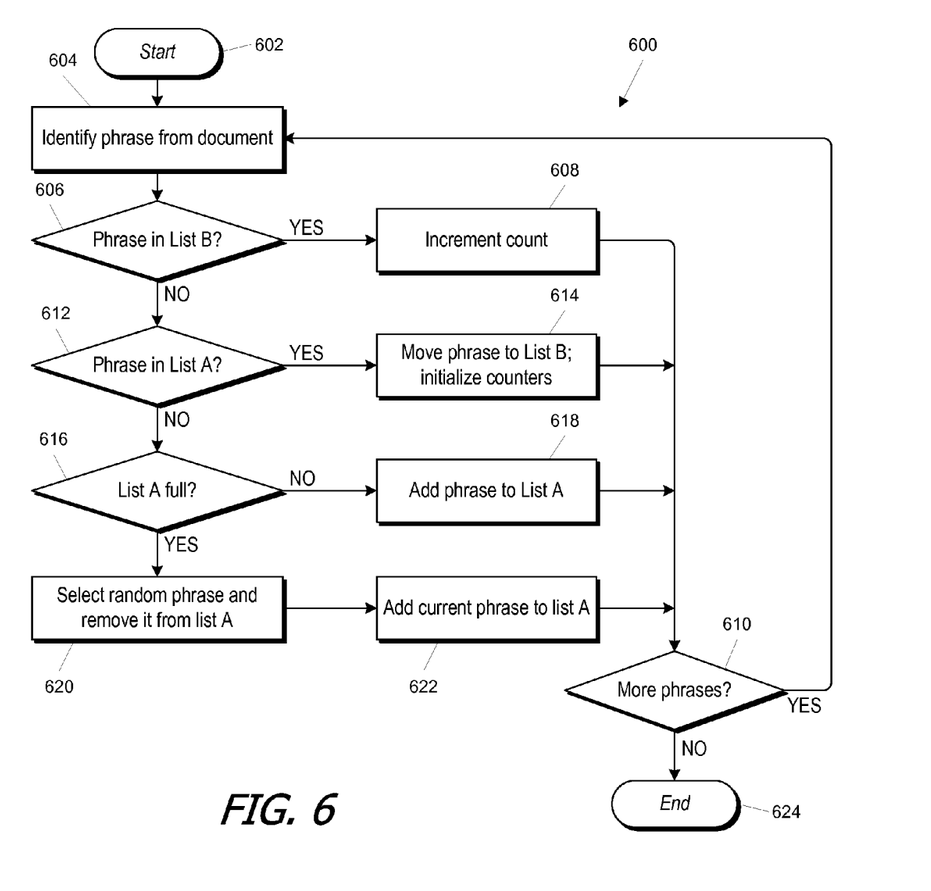
FIG. 6 is a flow diagram of a process for managing the phrase list structure of FIG. 5 according to an embodiment of the invention.

FIG. 6 is a flow diagram of a process 600 for managing phrase list structure 500 of FIG. 5 according to an embodiment of the invention. Process 600 can be used, e.g., at block 312 of process 300 (FIG. 3) to update the phrase list.

Process 600 starts (block 602) with a document to be processed. At block 604, a phrase from the document is identified. At block 606, the phrase is checked against list B 504 to determine whether the phrase is present in list B 504. If so, then the count is incremented at block 608. Incrementing the count can include incrementing the occurrence count and also, if this is the first occurrence of the phrase in the current document, incrementing the document count. Process 600 can then proceed to the next phrase at block 610.

If the phrase is not in list B 504, then at block 612, process 600 determines whether the phrase appears in list A 502. If so, then at block 614, the phrase is promoted by being removed from list A 502 and added to list B 504. The counter and document counter can be initialized appropriately, and process 600 can proceed to the next phrase at block 610.

If the phrase is not in list B 504 or list A 502, then at block 616, process 600 determines if list A 502 is full, i.e., whether it contains the predetermined maximum number of phrases. If not, then the phrase is added to list A 502 at block 618. If list A 500 is full, then at block 620, a phrase is selected to be removed from list A (e.g., using random selection or another technique), and at block 622 the new phrase is added to list A. Thereafter, process 600 can proceed to the next phrase at block 610. When all phrases in the current document have been processed, process 600 ends (block 624).

Process 600 can be used for each document in the corpus, with lists A and B growing and being continually updated as additional documents are processed.

Process 600 provides for a tradeoff between tracking every possible phrase and performance of the phrase-identification algorithm. It is assumed that n-tuples that occur only once in a large corpus are unlikely to be meaningful phrases; thus, such n-tuples can be dropped from consideration. However, it is not possible to know in advance of n-tuple extraction which n-tuples will occur more than once. Since the list of single-occurrence candidate phrases is limited in size, it is possible that an n-tuple would be dropped from that list only to occur again later. However, if the probability of a particular phrase is greater than one divided by the maximum number of entries on the list of single-occurrence phrases (one in one million according to one embodiment), it is very likely that this phrase would be seen again before it is dropped. For a sufficiently large list of single-occurrence phrases, it is unlikely that a phrase that occurs often enough to be meaningful would be dropped from the list. By adjusting the maximum size of the single-occurrence list, it is possible to ensure (with high probability) that all phrases above a certain probability of occurrence will be promoted to the list of multiple-occurrence phrases, and it will be possible to make accurate estimates of the probability that these phrases are not chance conjunctions. Some single-occurrence phrases will be lost, but such phrases are not likely to be useful for clustering, and the savings in storage requirements is considerable. The risk of losing a useful phrase can be balanced against storage requirements by adjusting the size limit of the single-occurrence list.

This approach can be generalized to more than two lists. For example, there could be a list of phrases that occur once, a list of phrases that occur twice, and a list of phrases that occur three or more times. When the first list fills up, a phrase is removed; when the second list fills up, a phrase is demoted to the first list.

In some embodiments, all phrases of two or more words are managed using one set of lists. In another embodiment, separate sets of lists can be provided for phrases of different lengths; thus, there can be a pair of lists for two-word phrases, a separate pair of lists for three-word phrases, and so on up to the maximum phrase length considered.

Use of Phrases in Document Vectors and Clustering

Referring back to FIG. 2, after a set of meaningful phrases has been selected, document vectors are constructed using the words and meaningful phrases. A document vector can be constructed by arranging a list of words and phrases (in an arbitrary order) to define vector components and populating each component with a count of the number of occurrences of the corresponding word or phrase. The counts can be weighted, e.g., based on importance of the term. In some embodiments, the weight is given by log (1/D), where D is the number of documents in which the term occurs at least once. Other weights can also be used. The component terms and weights are the same for all documents; only the counts differ.

In some embodiments, the number of phrases included in the document vector can be limited, e.g., to a maximum of 50 phrases; the number of words can be but need not be limited.

Clustering can proceed according to conventional clustering techniques based on comparing document vectors. Clustering can produce, e.g., a hierarchical set of clusters, and clusters can be defined based on features of the document vector as is known in the art. The fact that some components of the document vectors correspond to phrases rather than single words need not affect clustering operations.

Naming Clusters Using Words and Phrases

In block 210 of FIG. 2, a name is assigned to each cluster. In some embodiments, a cluster name is automatically assigned, and the name can simply consist of a list of the M (e.g., 3 or 5) most frequently occurring terms (words or phrases) in the cluster. It is possible that some or all of the most frequently occurring words are also within the most frequently occurring phrases. Thus, the top three terms for a particular cluster might be ("computer," "security," "computer security"). For another cluster, the top three might be ("New York," "Yankees," "New York Yankees").

Where a word appears in two different terms, having both terms in the cluster name may not be desirable. Accordingly, in some embodiments, once the top terms are selected, a further comparison is made to determine whether any words in the list are also in phrases in the list or whether any phrases in the list are in longer phrases that are also in the list. If this is the case, one of the two terms can be eliminated and optionally replaced with a different term.

Figure 7:
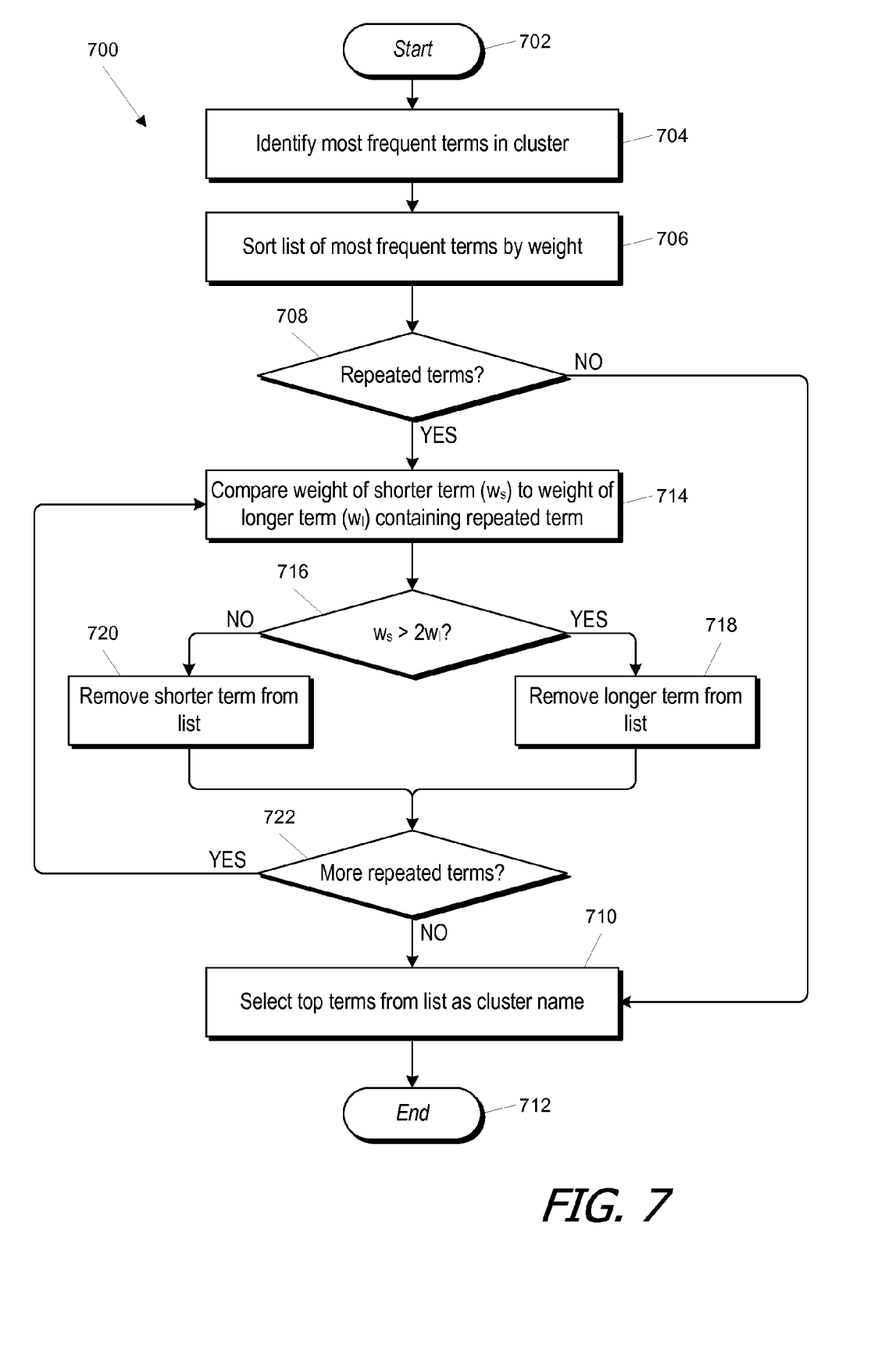
FIG. 7 is a flow diagram of a process for automatically generating a cluster name according to an embodiment of the present invention.

FIG. 7 is a flow diagram of a process 700 for automatically generating a cluster name according to an embodiment of the present invention. Process 700 starts (block 702) when a cluster has been formed, e.g., using clustering algorithms that incorporate words and meaningful phrases. At block 704, the most frequently-occurring terms are identified, and at block 706, these terms are sorted into a list according to the weights assigned thereto. (As noted above, the weight can be log (1/D) or some other weight.) At block 708, it is determined whether the list contains any repeated terms. For example, a word may appear in the list on its own and as part of a phrase, or a phrase may appear on its own and as part of a longer phrase. If there are no repeated terms, then the top weighted terms on the list (e.g., 3 or 5 terms) can be selected as the cluster name at block 710 before process 700 ends at block 712.

If, however, there are repeated terms, the list is pruned so that only one instance of the term appears. For example, at block 714 the weight ($w_s$) of the shorter term (i.e., the term with fewer words) is compared to the weight $w_l$ of the longer term. At block 716, a threshold test is applied to the weights. The threshold test can favor the longer term (e.g., "New York Yankees" over "Yankees") unless the shorter term outweighs it by a significant margin. In one such embodiment, the threshold is set such that the longer term is selected unless $w_s$ is greater than twice $w_l$; other tests can be substituted.

If the threshold test is met, the longer term is removed from the list (block 718); otherwise, the shorter term is removed (block 720). If repeated terms still remain (block 722), process 700 returns to block 708 for further pruning of the list. Once all repeated terms have been removed (i.e., no word occurs in more than one term), the top weighted terms can be selected at block 710.

It will be appreciated that process 700 is illustrative and that variations and modifications are possible. Steps described as sequential may be executed in parallel, order of steps may be varied, and steps may be modified, combined, added or omitted. For instance, when pruning, single words that appear in phrases can be pruned, followed by two-word phrases that appear in longer phrases, and so on. Criteria for selecting between shorter and longer terms can also be varied.

Further Embodiments

While the invention has been described with respect to specific embodiments, one skilled in the art will recognize that numerous modifications are possible. For instance, the particular statistical metrics for distinguishing meaningful phrases from chance occurrences can be varied; any metric that is based on the frequency of occurrence of a particular sequence of words and that measures the likelihood of that frequency occurring by chance can be used.

The phrase list management technique described herein is also illustrative and can be modified. The limits on the list(s) with limited size can be selected as desired, based on tradeoffs between available storage and performance. In general, longer lists reduce the probability of a semantically meaningful phrase going unrecognized; however, longer lists require more storage space and can increase the time required to determine whether a given word sequence is already on the list.

As described above, embodiments of the present invention may be implemented as computer programs. Such programs may be encoded on various computer readable media for storage and/or transmission; suitable media include magnetic disk or tape, optical storage media such as compact disc (CD) or DVD (digital versatile disc), flash memory, and the like. Computer readable media encoded with the program code may be packaged with a device (e.g., microprocessor) capable of executing the program or provided separately from such devices.

In addition, while the embodiments described above may make reference to specific hardware and software components, those skilled in the art will appreciate that different combinations of hardware and/or software components may also be used and that particular operations described as being implemented in hardware might also be implemented in software or vice versa.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Thus, although the invention has been described with respect to specific embodiments, it will be appreciated that the invention is intended to cover all modifications and equivalents within the scope of the following claims.

What is claimed is:

1. A method of extracting phrases from a corpus of documents, the method comprising:
    generating, by a processor, a set of candidate phrases from the documents in the corpus, wherein each candidate phrase corresponds to a group of two or more words that occur consecutively in at least one of the documents in the corpus, each candidate phrase having an occurrence count associated therewith, wherein generating the set of candidate phrases includes:
        extracting a group of consecutive words from one of the documents in the corpus;
        determining whether the group of consecutive words appears as one of the candidate phrases in a first list of candidate phrases;
        in the event that the group of consecutive words appears as one of the candidate phrases in the first list, incrementing an occurrence count associated with the one of the candidate phrases; and
        in the event that the group of consecutive words does not appear as one of the candidate phrases in the first list:
            determining whether the group of consecutive words appears as one of the candidate phrases in a second list of candidate phrases, wherein each candidate phrase in the second list is associated with an occurrence count equal to 1;
            in the event that the group of consecutive words appears as one of the candidate phrases in the second list, promoting the one of the candidate phrases to the first list; and
            in the event that the group of consecutive words does not appear as one of the candidate phrases in the second list, adding the group of consecutive words as a new candidate phrase to the second list;
    computing, by the processor, a statistical metric for each candidate phrase based at least in part on the occurrence count, wherein the statistical metric indicates a likelihood of the words within the candidate phrase occurring consecutively by chance; and
    selecting, by the processor, a plurality of the candidate phrases as meaningful phrases, the selection being based on the statistical metric.

2. The method of claim 1 wherein the statistical metric is a mutual information metric.

3. The method of claim 1 wherein the second list has a predetermined upper limit on a number of candidate phrases includable therein, the method further comprising, in the event that the group of consecutive words does not appear as a candidate phrase in the second list:
    determining whether the number of candidate phrases in the second list has reached the upper limit; and
    in the event that the number of candidate phrases in the second list has reached the upper limit:
        selecting a candidate phrase from the second list; and
        deleting the selected candidate phrase from the second list prior to adding the group of consecutive words to the second list.

4. The method of claim 3 wherein selecting the candidate phrase from the second list includes randomly selecting the candidate phrase to be deleted from the second list.

5. The method of claim 1 further comprising:
    constructing, by the processor, a document vector for each of a plurality of documents from the corpus, the document vector including a first plurality of components corresponding to words and a second plurality of components corresponding to at least some of the meaningful phrases; and
    forming, by the processor, a plurality of clusters of documents based at least in part on the document vectors.

6. The method of claim 5 wherein selecting the meaningful phrases includes:
    computing a phrase weight for each candidate phrase, the phrase weight being based on a number of documents in the corpus that contain the candidate phrase; and
    selecting the meaningful phrases based on the phrase weights.

7. The method of claim 6 wherein the phrase weight for a candidate phrase is defined as log (1/D), wherein D is the number of documents in the corpus that contain the candidate phrase.

8. The method of claim 6 wherein selecting the meaningful phrases based on the phrase weights includes setting a minimum threshold on the phrase weight and selecting, as meaningful phrases, the candidate phrases whose phrase weights exceed the minimum threshold.

9. The method of claim 5 further comprising assigning a name to each of the clusters of documents, wherein assigning a name to each of the clusters of documents includes:
    identifying, as candidate terms, a plurality of most frequently occurring terms for the cluster, wherein each term is either a word, or a meaningful phrase;
    determining whether any word appears in more than one of the candidate terms;
    in the event that a word appears in more than one of the candidate terms, selecting only one of the terms in which the word appears as a candidate term; and
    thereafter selecting some of the candidate terms to be included in the name for the cluster, the selection being based on weights associated with the candidate terms, wherein the name includes a plurality of terms and wherein no word appears in more than one of the plurality of terms in the name.

10. A non-transitory computer-readable storage medium containing program instructions, which when executed by a computer system cause the computer system to execute a method of forming document clusters from a corpus of documents, the method comprising:
    generating a set of candidate phrases from the documents in the corpus, wherein each candidate phrase corresponds to a group of two or more words that occur consecutively in at least one of the documents in the corpus;

computing a mutual information metric for each candidate phrase based on one or more occurrences of the candidate phrase and one or more separate occurrences of the words within the candidate phrase;

selecting a plurality of meaningful phrases from the set of candidate phrases, the selection being based on the mutual information metric;

using occurrence patterns of the meaningful phrases and a plurality of single words in the documents to form a plurality of document clusters; and assigning a name to each of the clusters, wherein assigning the name to at least one of the clusters includes:
identifying, as candidate terms, a plurality of most frequently occurring terms for the cluster, wherein each term is either a word or a meaningful phrase;
determining whether any word a ears in more than one of the candidate terms;
in the event that a word appears in more than one of the candidate terms, selecting only one of the terms in which the word appears as a candidate term; and
thereafter selecting some of the candidate terms to be included in the name for the cluster, the selection being based on weights associated with the candidate terms, wherein the name includes a plurality of terms and wherein no word appears in more than one of the plurality of terms in the name.

11. The computer-readable storage medium of claim 10 wherein computing the mutual information metric includes, in the event that the candidate phrase corresponds to a group of two consecutive words, computing a mutual information metric (I) using a formula:

$$I = p(A, B)\log\frac{p(A, B)}{p(A)p(B)},$$

wherein:
p(A) represents a probability that the first word of a pair of consecutive words in a document is the first word of the candidate phrase;
p(B) represents a probability that the second word of a pair of consecutive words in a document is the second word of the candidate phrase; and
p(A, B) represents a probability that a pair of consecutive words in a document corresponds to the candidate phrase.

12. A computer system comprising:
a storage subsystem, wherein the storage subsystem is configured to store a first list of candidate phrases and a second list of candidate phrases, wherein each candidate phrase in the first list of candidate phrases has a count value associated therewith; and
a processor coupled to the storage subsystem, the processor being configured to:
extract and store in the storage subsystem a set of candidate phrases from a corpus of documents, wherein each candidate phrase corresponds to a group of two or more words that occur consecutively in at least one of the documents in the corpus, wherein extracting the set of candidate phrases includes:
extracting a group of two or more consecutive words from one of the documents in the corpus;
determining whether the group of two or more consecutive words appears as one of the candidate phrases in the first list of candidate phrases;
in the event that the group of two or more consecutive words appears as one of the candidate phrases in the first list, incrementing the count value associated with the one of the candidate phrases; and
in the event that the group of two or more consecutive words does not appear as one of the candidate phrases in the first list:
determining whether the group of two or more consecutive words appears as one of the candidate phrases in the second list;
in the event that the group of two or more consecutive words appears as one of the candidate phrases in the second list, moving the One of the candidate phrases from the second list to the first list; and
in the event that the group of two or more consecutive words does not appear as one of the candidate phrases in the second list, adding the group of consecutive words as a new candidate phrase to the second list;
compute a statistical metric for each of the candidate phrases based on occurrence count data indicating a number of occurrences of the candidate phrase in documents of the corpus and a number of occurrences of the words making up the candidate phrase, wherein the statistical metric indicates a likelihood of the words within the candidate phrase occurring consecutively by chance;
select one or more phrases from the set of candidate phrases as a meaningful phrase, the selection being based on the statistical metric; and
store a list of the meaningful phrases in the storage subsystem.

13. The computer system of claim 12 wherein the second list has a predetermined upper limit on a number of candidate phrases includable therein and wherein the processor is further configured to:
determine, in the event that the group of consecutive words does not appear as a candidate phrase in the second list, whether the number of candidate phrases in the second list has reached the upper limit; and
in the event that the number of candidate phrases in the second list has reached the upper limit:
select a candidate phrase from the second list; and
delete the selected candidate phrase from the second list prior to adding the group of consecutive words to the second list.

14. The computer system of claim 13 wherein the processor is further configured such that the candidate phrase to be deleted from the second list is selected randomly.

15. The computer system of claim 12 wherein the processor is further configured to compute the statistical metric as a mutual information metric (I) using a formula:

$$I = p(A, B)\log\frac{p(A, B)}{p(A)p(B)},$$

wherein:
p(A) represents a probability that the first word of a pair of consecutive words in a document is the first word of the candidate phrase;

p(B) represents a probability that the second word of a pair of consecutive words in a document is the second word of the candidate phrase; and p(A, B) represents a probability that a pair of consecutive words in a document corresponds to the candidate phrase.

16. The computing system of claim 12 wherein the processor is further configured to use the meaningful phrases and single words in the documents of the corpus to form a plurality of document clusters and to store, in the storage subsystem, information about each of the document clusters.

17. The computing system of claim 16 wherein the stored information about each of the document clusters includes a cluster name and wherein the processor is further configured to assign a cluster name to at least one of the document clusters by:

identifying, as candidate terms, a plurality of most frequently occurring terms for the cluster, wherein each term is either a word or a meaningful phrase;

determining whether any word appears in more than one of the candidate terms;

in the event that a word appears in more than one of the candidate terms, selecting only one of the terms in which the word appears as a candidate term; and thereafter selecting some of the candidate terms to be included in the name for the cluster, the selection being based on weights associated with the candidate terms, wherein the name includes a plurality of terms and wherein no word appears in more than one of the plurality of terms in the name.

\* \* \* \* \*